Nov. 6, 1934.                C. CLARK                 1,979,530
                        MATERIAL KICKING MACHINE
                    Filed Oct. 25, 1933      3 Sheets-Sheet 2

Charles Clark
INVENTOR
BY Victor J. Evans & Co.
ATTORNEY

Nov. 6, 1934.  C. CLARK  1,979,530
MATERIAL KICKING MACHINE
Filed Oct. 25, 1933  3 Sheets-Sheet 3

Charles Clark
INVENTOR

BY Victor J. Evans & Co.
ATTORNEY

Patented Nov. 6, 1934

1,979,530

UNITED STATES PATENT OFFICE 1,979,530

MATERIAL KICKING MACHINE

Charles Clark, Huntington, W. Va., assignor of one-third to Arthur H. Raynor, Huntington, W. Va.

Application October 25, 1933, Serial No. 695,187

7 Claims. (Cl. 262—19)

The invention relates to a machine for loosening semi-solid material, particularly coal, rock, ore or other lump material, and more especially to a coal kicker.

The primary object of the invention is the provision of a machine or apparatus of this character, wherein coal or other lump material as contained within a car, as for example of the gondola type with a discharge door in its bottom, can be kicked or loosened so as to assure the free feeding of the material and its positive discharge from the car, this being necessary during freezing weather because the material becomes hardened, avoiding free flowing thereof and making it hazardous for the manual handling of the same in the unloading of the material from the car, the machine or apparatus being of novel construction.

Another object of the invention is the provision of a machine or apparatus of this character, wherein it is rendered mobile superposed with relation to tracks upon which travel the loaded cars, so that such machine or apparatus can be properly located with respect to any selected track and in the working thereof will kick or loosen the load of a particular car or cars to assure the easy discharge or delivery of the material from the car or cars, the machine or apparatus being particularly adaptable for the kicking of lump coal or soft coal to assure the fluidity thereof in unloading.

Another object of the invention is the provision of a machine or apparatus of this character, wherein the same is of a construction requiring but a single attendant and in the working is automatic for disintegrating or loosening of material loaded upon a car or cars for the free unloading thereof.

A still further object of the invention is the provision of a machine or apparatus of this character which is comparatively simple in construction, thoroughly reliable and efficacious in its purpose, readily and easily handled, automatically operated, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 5 is a fragmentary sectional view through the driving connection for the kicker mechanism.

Similar reference characters indicate corresponding parts throughout the several views in the drawings.

Figure 1:
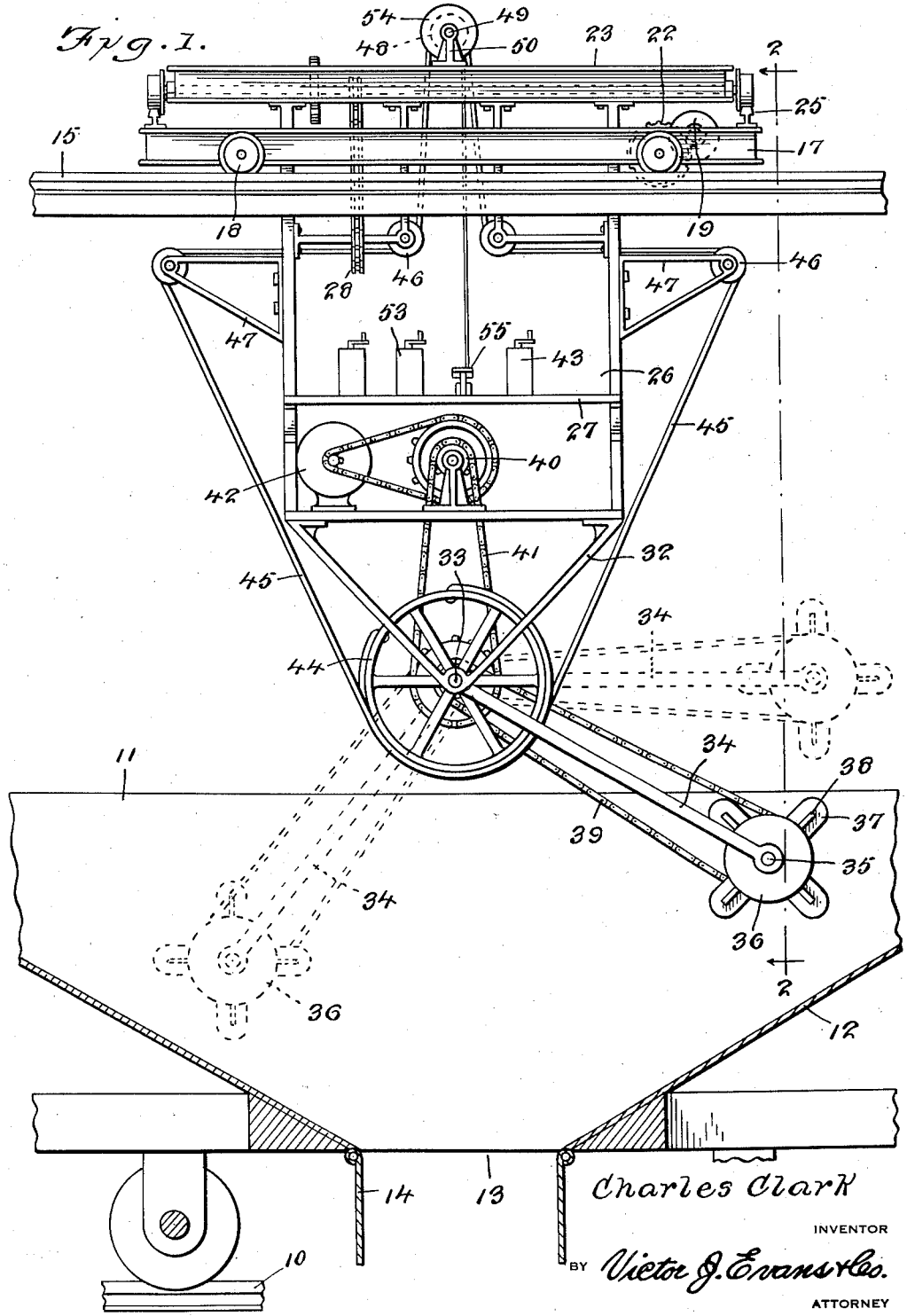
Figure 1 is a side elevation of the machine or apparatus related to a gondola type of car and constructed in accordance with the invention, the kicking mechanism being shown in full lines in one position and by dotted lines in other positions, identifying the sweep thereof.
Figure 2:
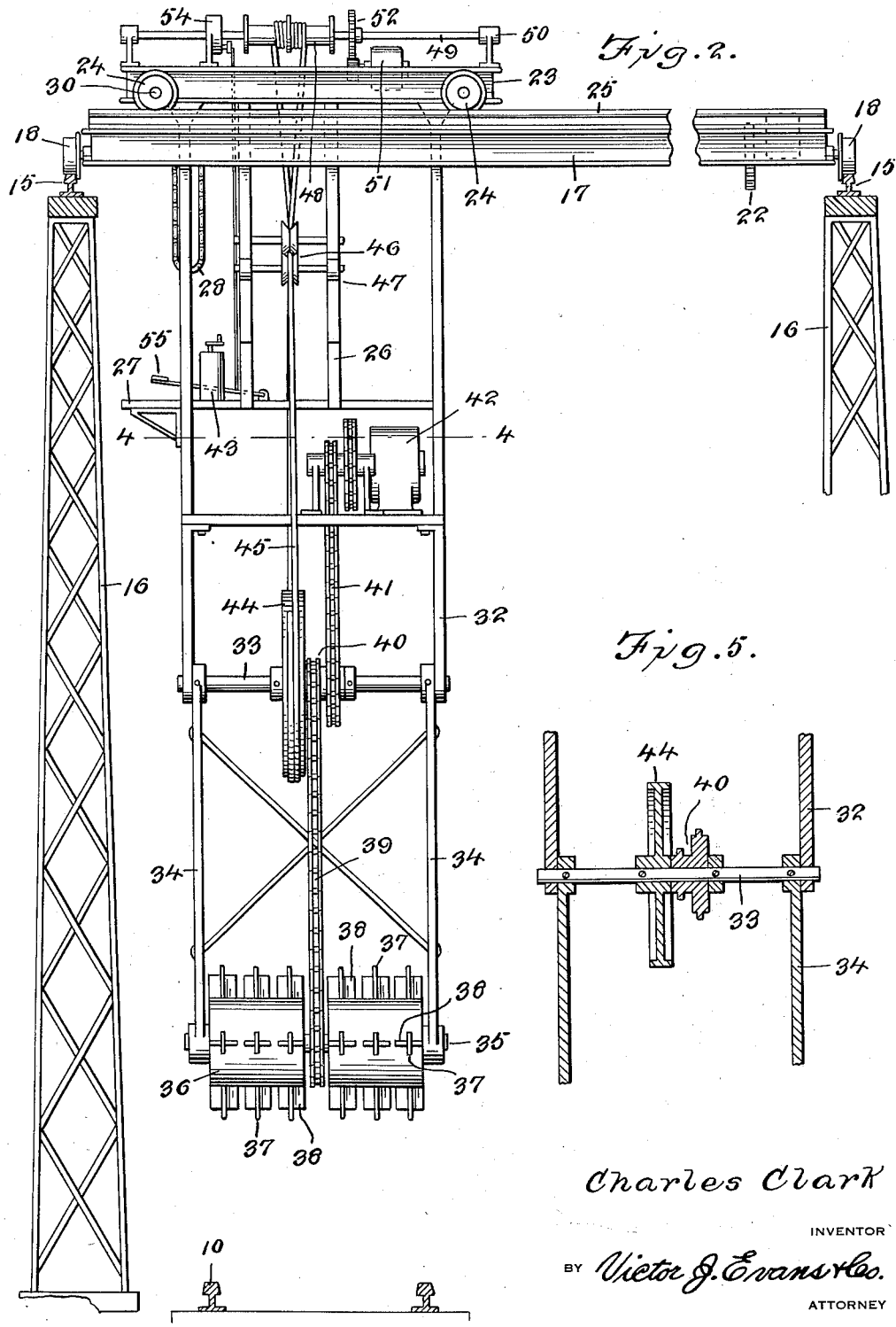
Figure 2 is a front elevation showing in section the trackage for the machine or apparatus and the car and taken approximately on the line 2—2 of Figure 1.
Figure 3:
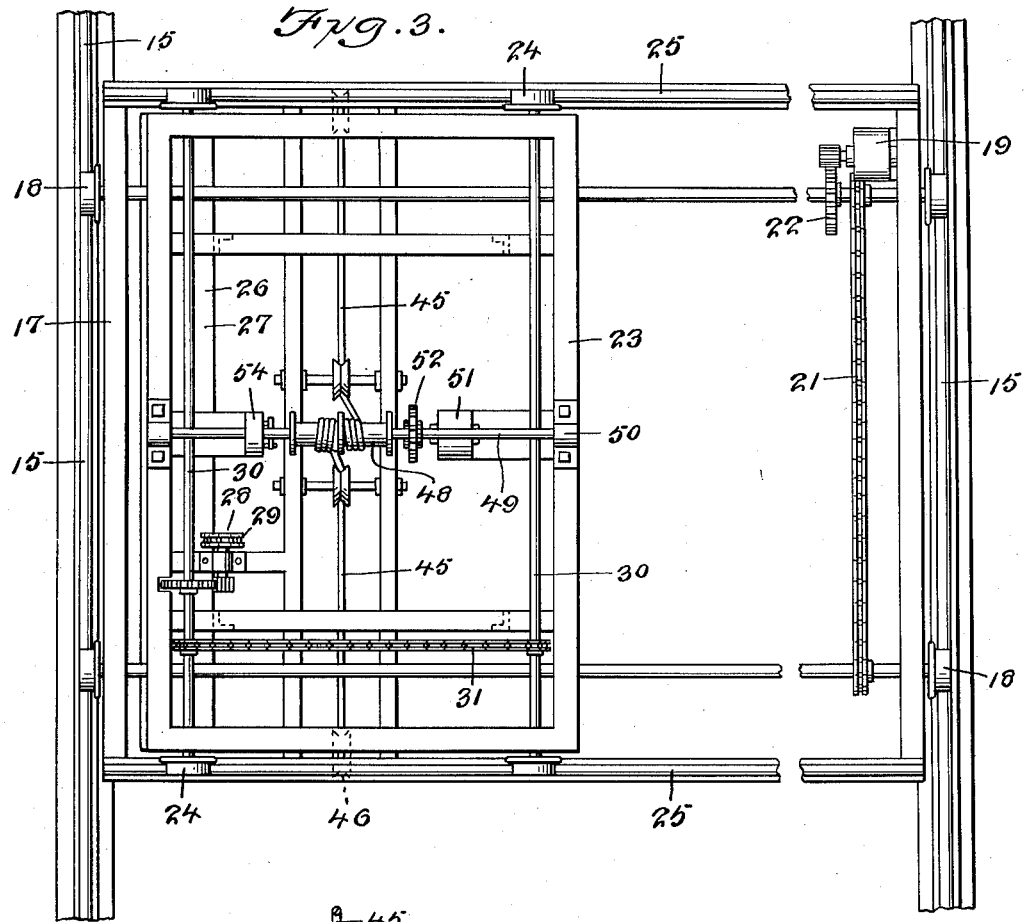
Figure 3 is a top plan view.
Figure 4:
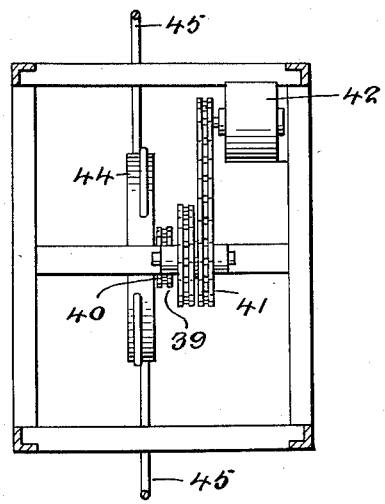
Figure 4 is a sectional view on the line 4—4 of Figure 2.

Referring to the drawings in detail, 10 designates a surface track for a car 11 of the gondola type, only a portion thereof being shown in Figure 1, having the hopper body 12 with the discharge 13 in its bottom, which discharge is controlled by swinging doors 14, as usual, and this car is adapted to be loaded with lump, semi-solid or loose material, such as coal, ore, rock or the like. It is to be understood that there may be a series of tracks 10 side by side, and overhead is arranged a track, this being aligned with the surface track, the rails 15 of the overhead track being supported upon uprights 16 similar to bridge erection.

Movable over the overhead track is the machine or apparatus constituting the present invention including the mobile truck 17, its traction wheels 18 traversing the rails 15 of the overhead track so that the truck 17 can travel in alignment with the travel of the car 11 upon the surface track or tracks.

Suitably supported on the truck 17 is an electric power motor 19 regulated from a control 20 and this motor includes a braking mechanism (not shown). The motor 19, through the chain and gear drives 21 and 22, respectively, operates the traction wheels 18 of the truck for the travel thereof on the overhead track.

The truck 17 supports a carriage 23, its traction wheels 24 traveling upon rails 25 upon the truck 17, these rails being spaced apart and in parallel relation to each other transversely of the surface trackage so that the carriage 23 can be moved upon the truck 17 crosswise of the surface trackage.

Built with and depending from the carriage is a cab 26 having the platform 27 supporting the control 20 for the motor 19. Within convenient reach by an attendant when occupying the platform 27 is a manually operated endless chain 28, the same being trained over a sprocket gear 29, which through suitable gearing operates one of the axles 30 of the traction wheels 24, the other axle 30 being operated in unison with the one having the connection with sprocket gear 29 through a chain and sprocket connection 31 and it will be apparent that when the chain 28 is manually operated the carriage 23 will be driven to change the position thereof upon the truck 17 to have said carriage 23 vertically align with the surface trackage, that is, a particular track of the same.

Carried by the cab 26 are the depending hangers 32 supporting a horizontally disposed driven shaft 33 and to this shaft are fixed the swinging arms 34 of the kicking mechanism. The arms have journaled therein the axle 35 of a pair of spaced rotors 36, each fitted with radially disposed cutting blades or bits 37 and shoveling blades or bits 38, these being at right angles to the blades or bits 37 and both series of bits are equally spaced about the circumference of the rotors 36 for service in cutting, loosening and shoveling the material as contained within the body 12 of the car 11 on the shifting of the arms 34 of said kicking mechanism, whereby the loosened material will freely flow through the discharge 13 for delivery from the car.

The shaft 33, through the sprocket chain and gear connection 39 with the axle 35, drives the rotors 36, the gear 40 of this connection 39 being loose on the shaft 33, and through the sprocket chain connection 41 with the motor 42 the said rotors 36 will be driven without any interference whatsoever with the swinging of the arms 35. The motor is regulated by a control 43 upon the platform 27 and is of the electric type.

Upon the shaft 33 is fixed a belt wheel or pulley 44 upon which is reversely wound and driven a belt or cable 45, the same being trained over suitable guide pulleys 46 upon brackets 47 and reversely wound upon a windlass 48, its shaft or axle 49 being supported in suitable bearings 50 upon the carriage 23. This carriage 23 carries a reversing motor 51 for driving through the gears 52 the axle or shaft 49 and said motor is regulated by the control 53 upon the platform 27 in the cab 26. It should be seen that when the motor 51 is operated from the control 53 the kicking mechanism can be oscillated to swing the rotors 36 as is exhibited by full and dotted lines in Figure 1 of the drawings to unload and load the material within the body 12 of the car for the loosening or kicking of such material, whereby it will freely flow through the discharge 13 for the unloading of the car, this being necessary during freezing weather as the material within the body 12 of said car 11 becomes solidified and it is extremely difficult and hazardous for the hand shoveling thereof.

Fitted with the axle or shaft 49 of the windlass 48 is a braking mechanism 54, the same being controlled by a foot pedal 55 upon the platform 27 and in this manner the rotation of the shaft 49 is under positive control.

It should be apparent that the machine or apparatus can be regulated to set the same with relation to a loaded car upon the surface trackage and in the working of the apparatus the material constituting the load of the car 11 can be kicked or loosened to assure the positive and free feeding of such material in the unloading of the car and discharge through the discharge opening 13 in the bottom of the body 12, thereby eliminating manual labor for this purpose.

What is claimed is:

1. The combination with sub-trackage, of overhead trackage with relation thereto, a truck movable over the overhead trackage, a carriage movable on the truck at right angles to its path of travel, a cab suspended by said carriage, material kicking mechanism swingably mounted upon said cab and including cutting and shoveling bits rotatably arranged, and means for rotating the bits and swinging said mechanism.

2. The combination with sub-trackage, of overhead trackage with relation thereto, a truck movable over the overhead trackage, a carriage movable on the truck at right angles to its path of travel, a cab suspended by said carriage, material kicking mechanism swingably mounted upon said cab and including cutting and shoveling bits rotatably arranged, means for rotating the bits and swinging said mechanism, and power means for operating the truck.

3. The combination with sub-trackage, of overhead trackage with relation thereto, a truck movable over the overhead trackage, a carriage movable on the truck at right angles to its path of travel, a cab suspended by said carriage, material kicking mechanism swingably mounted upon said cab and including cutting and shoveling bits rotatably arranged, means for rotating the bits and swinging said mechanism, power means for operating the truck, and manually controlled means for operating the carriage.

4. The combination with sub-trackage, of overhead trackage with relation thereto, a truck movable over the overhead trackage, a carriage movable on the truck at right angles to its path of travel, a cab suspended by said carriage, material kicking mechanism swingably mounted upon said cab and including cutting and shoveling bits rotatably arranged, means for rotating the bits and swinging said mechanism, power means for operating the truck, manually controlled means for operating the carriage, and power means for imparting oscillatory movement to the kicking mechanism.

5. The combination with sub-trackage, of overhead trackage with relation thereto, a truck movable over the overhead trackage, a carriage movable on the truck at right angles to its path of travel, a cab suspended by said carriage, material kicking mechanism swingably mounted upon said cab and including cutting and shoveling bits rotatably arranged, means for rotating the bits and swinging said mechanism, power means for operating the truck, manually controlled means for operating the carriage, power means for imparting oscillatory movement to the kicking mechanism, and means for supporting the overhead trackage.

6. The combination with sub-trackage, of overhead trackage with relation thereto, a truck movable over the overhead trackage, a carriage movable on the truck at right angles to its path of travel, a cab suspended by said carriage, material kicking mechanism swingably mounted upon said cab and including cutting and shoveling bits rotatably arranged, means for rotating the bits and swinging said mechanism, power means for operating the truck, manually controlled means for operating the carriage, power means for imparting oscillatory movement to the kicking mechanism, means for supporting the overhead trackage, and controls in the cab for the respective power means.

7. The combination with sub-trackage, of overhead trackage with relation thereto, a truck movable over the overhead trackage, a carriage movable on the truck at right angles to its path of travel, a cab suspended by said carriage, material kicking mechanism swingably mounted upon said cab and including cutting and shoveling bits rotatably arranged, means for rotating the bits and swinging said mechanism, power means for operating the truck, manually controlled means for operating the carriage, power means for imparting oscillatory movement to the kicking mechanism, means for supporting the overhead trackage, controls in the cab for the respective power means, and brake mechanism manually controlled for regulating the speed of the power means for oscillating the kicking mechanism.

CHARLES CLARK.